United States Patent
Vollmerhausen

(10) Patent No.: US 10,587,347 B1
(45) Date of Patent: Mar. 10, 2020

(54) HETERODYNE STARRING ARRAY ACTIVE IMAGER

(71) Applicant: Richard H. Vollmerhausen, Lake Mary, FL (US)

(72) Inventor: Richard H. Vollmerhausen, Lake Mary, FL (US)

( * ) Notice: Subject to any disclaimer, the term of this patent is extended or adjusted under 35 U.S.C. 154(b) by 0 days.

(21) Appl. No.: 16/548,757

(22) Filed: Aug. 22, 2019

Related U.S. Application Data

(60) Provisional application No. 62/720,978, filed on Aug. 22, 2018.

(51) Int. Cl.
| | |
|---|---|
| *H04B 10/00* | (2013.01) |
| *H04B 10/64* | (2013.01) |
| *G01S 7/4912* | (2020.01) |
| *H01S 3/08* | (2006.01) |
| *G01S 17/89* | (2020.01) |
| *H01S 3/063* | (2006.01) |
| *G01S 7/481* | (2006.01) |
| *H04J 14/00* | (2006.01) |

(52) U.S. Cl.
CPC .............. *H04B 10/64* (2013.01); *G01S 7/481* (2013.01); *G01S 7/4917* (2013.01); *G01S 17/89* (2013.01); *H01S 3/0635* (2013.01); *H01S 3/08086* (2013.01); *H04B 10/142* (2013.01)

(58) Field of Classification Search
CPC combination set(s) only.
See application file for complete search history.

(56) References Cited

U.S. PATENT DOCUMENTS

| | | |
|---|---|---|
| 5,146,358 A | 9/1992 | Brooks |
| 6,664,529 B2 | 12/2003 | Pack et al. |
| 6,931,031 B2 | 8/2005 | Williams et al. |
| 7,049,597 B2 | 5/2006 | Bodkin |
| 7,233,392 B2 | 6/2007 | Margalith et al. |
| 7,449,673 B2 | 11/2008 | Chuang et al. |
| 7,667,824 B1 | 2/2010 | Moran |
| 7,995,191 B1 | 8/2011 | Sandusky |
| 2005/0046857 A1 | 3/2005 | Bingham et al. |
| 2009/0046296 A1* | 2/2009 | Kilpatrick ............. G01H 9/004 356/484 |
| 2016/0036535 A1* | 2/2016 | Stayer ...................... G01J 9/04 398/207 |

* cited by examiner

*Primary Examiner* — Daniel G Dobson
(74) *Attorney, Agent, or Firm* — Beusse, Wolter, Sanks & Maire PLLC; John L. DeAngelis

(57) ABSTRACT

A heterodyne starring array active imager for producing an image. The imager comprises a light source intermittently illuminating a scene and an array of light collecting sites imaging the scene, each one comprising: a coupling component optically coupling scene light into a first waveguide and a local oscillator light coupled into a second waveguide. The first and second waveguides coupled to a third waveguide such that the scene light and local oscillator light propagate into the third waveguide. A square law photo detector associated with each light collecting site receives the merged light for heterodyning the scene light and the local oscillator light. Components receive and process the heterodyned light from the photo detectors to produce a frame signal for each light collecting site. A read-out device produces an array signal responsive to the frame signal from each light collecting site.

20 Claims, 8 Drawing Sheets

HETERODYNE STARRING ARRAY ACTIVE IMAGER

CROSS REFERENCE TO RELATED APPLICATIONS

The present application claims priority to a provisional application filed on Aug. 22, 2018, entitled Heterodyne Starring Array Imager, assigned application No. 62/720,978, which is incorporated herein.

FIELD OF THE INVENTION

The present disclosure relates to imaging, and more particularly to systems and methods for heterodyne detection of active radiation in a starring imager configuration.

OBJECT OF THE INVENTION

There is a long felt need both commercially and by the military for small, inexpensive, power efficient, eye-safe, and solid-state active imagers that provide range-gated imagery plus accurate pixel-by-pixel range that is unaffected by bright sunlit backgrounds.

BACKGROUND DESCRIPTION OF THE PRIOR ART

U.S. Pat. No. 7,995,191 B1 to Sandusky (hereinafter "Sandusky") and assigned to Sandia Corporation discloses a scannerless 3-D imaging apparatus which utilizes an amplitude modulated continuous wave light source to illuminate a field of view containing a desired target. Backscattered light from the target is passed through one or more loss modulators which are modulated at the same frequency as the light source, but with a phase delay δ which can be fixed or variable. The backscattered light is demodulated by the loss modulator and detected with a CCD, CMOS or focal plane array (FPA) detector to construct a 3-D image of the target. The scannerless 3-D imaging apparatus, which can operate in the eye-safe wavelength region 1.4-1.7 μm and which can be constructed as a flash LADAR, has applications for vehicle collision avoidance, autonomous rendezvous and docking, robotic vision, industrial inspection and measurement, 3-D cameras, and facial recognition.

Unlike the current invention, Sandusky applies only to active imaging and does not use heterodyning. Passive imagery is not sensed at all. For active imaging, Sandusky does not have the background light immunity advantages of HSAAI the Heterodyne Starring Array Active Imager (HSAAI) and is not multi-spectral.

U.S. Patent Application Pub. No. US 2005/0046857 A1 to Bingham et al. (hereinafter "Bingham") discloses systems and methods for spatial-heterodyne interferometry for transmission (SHIFT) measurements. A method includes digitally recording a spatially heterodyned hologram including spatial heterodyne fringes for Fourier analysis using a reference beam, and an object beam that is transmitted through an object that is at least partially translucent; Fourier analyzing the digitally recorded spatially-heterodyned hologram, by shifting an original origin of the digitally recorded spatially-heterodyned hologram to sit on top of a spatial-heterodyne carrier frequency defined by an angle between the reference beam and the object beam, to define an analyzed image; digitally filtering the analyzed image to cut off signals around the original origin to define a result; and performing an inverse Fourier transform on the result.

Bingham uses heterodyning in the sense of mixing beams for a hologram application but does not use photo detectors or waveguide technology. Further, the objective of Bingham is interferometry and not imaging, and real-time multi-spectral narrow band imagery with high sensitivity is not provided. Both the apparatus and objective are very different from the invention described in this application. In addition, Bingham does not provide any passive imagery.

U.S. Pat. No. 6,664,529 B2 to Pack et al. and assigned to Utah State University (hereinafter "Pack") discloses a 3D Multispectral Lidar. The system comprises a laser transmitter light source, a laser detection assembly, optics that couple the outgoing and incoming laser signals, a digital camera assembly for collecting passive light, a position and orientation system, and processing hardware. The system provides real-time georectified three dimensional images and topography using an airborne platform. The system collects time-synchronous Lidar range and image data in an optical receiver. The individual images are then mosaiced and orthorectified in real-time. The Lidar range data and image data are then coupled to a position and orientation system to transform the three-dimensional range images to a single geographically referenced multispectral three-dimensional image Pack includes direct detection passive imaging and does not employ either waveguide technology or heterodyning. Pack does not provide the multi-spectral and highly sensitive imagery of the invention described in this application.

U.S. Pat. No. 7,049,597 B2 to Bodkin (hereinafter "Bodkin") discloses a common aperture, multi-mode optical imager for imaging electromagnetic radiation bands from a field of two or more different wavelengths is described. Fore-optics are provided to gather and direct electromagnetic radiation bands forming an image into an aperture of the multi-mode optical imager. The image is divided into two different wavelength bands, such as visible light and long-wave infrared. The first wavelength band (e.g., visible light) is detected by a first detector, such as a CCD array, for imaging thereof. The second wavelength band (e.g., long-wave infrared) is detected by a second detector, such as an uncooled microbolometer array, for imaging thereof. Additional optics may be provided for conditioning of the first and second wavelength bands, such as such as for changing the magnification, providing cold shielding, filtering, and/or further spectral separation.

Bodkin uses direct detection and not heterodyning and does not provide the sensitivity or ability to image very narrow spectral bands that is provided by the invention described in this application. Further, the multiple spectral bands are independently imaged on separate detector arrays rather than gathered by optical collection elements and waveguided to spectral filters and then to heterodyned detectors. The current invention HSAAI provides the capability to switch spectral band selection, the ability to image many and not just two spectral bands, and sensitivity for narrow spectral bands not possible with the direct detection method of the App.

U.S. Pat. No. 6,931,031 B2 to Williams et al. and assigned to Aston University (hereinafter "Williams") discloses a dual wavelength optical fiber distributed feedback laser comprising a pump laser coupled to a birefringent fiber in which a first grating device (two co-located single phase-shift fiber Bragg gratings (FBGs)) is provided. The grating device gives the laser two potential lasing modes in each of two orthogonal polarization states. A polarization mode coupling FBG selects two orthogonally polarized modes on which the laser oscillates. In a photonic data carrying signal source, the laser is coupled to a polarization dependent, optical modulator operable to apply a modulation, at a data signal frequency, to one polarization mode of the laser output. In an optical waveguide based electronic signal transmission system the modulated and unmodulated polarization modes output from the source are transmitted across a fiber transmission line to a polarizing optical fiber in which the two modes heterodyne to generate an electronic carrier signal in the optical domain.

Williams uses some of the same basic tools as the current invention like Bragg gratings and waveguide modulators. However, the objective is completely different in that these components are used for the generation of laser light and not for imaging. Further, the basic tool set (spectral filtering, waveguiding in fibers) is implemented very differently to address the different objective.

U.S. Pat. No. 5,146,358 to Brooks and assigned to PYR Systems, Inc. (hereinafter "Brooks") discloses an optical communication system for disseminating information. The systems include a source of continuous wave laser light and one or more acoustic beams which are frequency or amplitude modulated by data. The laser light beam and the acoustic beam are input to an acousto-optical modulator for producing an undiffracted laser light beam and one or more diffracted laser light beams. The diffracted laser light beams are frequency shifted from the undiffracted laser light beam and contain the data to be transmitted. The diffracted and undiffracted beams are combined and transmitted over an optical fiber for demodulation at a distant location by a receiver. The receiver includes a photodiode which heterodynes the diffracted and undiffracted beams and produces signals having the frequencies of the acoustic beams. Tuning circuitry separates the signals and demodulators reconstruct the data transmitted. By using two such communication systems with a single optical fiber and by allocating the available bandwidth, simultaneous, bidirectional multichannel communications are achieved.

Brooks uses many of the same component parts as the invention described in this application but the objective and implementation of Brooks is very different. Brooks addresses communications and not imaging and does not use heterodyning in photo detectors to provide highly sensitive, multi-spectral images.

U.S. Pat. No. 7,667,824 issued to Moran discloses a range-gated sphearography system and related methods that includes at least one imaging detector coupled to a laser light source.

Moran implements surface vibration sensing by employing range gated techniques along with interferometers. Aside from implementing a different function than HSAAI, Moran does not use heterodyning, does not implement a starring array, and cannot be used for passive imaging.

U.S. Pat. No. 7,449,673 issued to Chuang, et al. discloses a system and method for reducing peak power of a laser pulse and reducing speckle contrast of a single pulse comprising a plurality of elements oriented so as to split a pulse or pulses transmitted from a light source.

Chuang achieves one of many benefits of HSAAI, namely reduction of speckle in active imagery. However, implementation is via splitting of optical beams, so the method is very different from HSAAI. In addition, other benefits of HSAAI are not disclosed in Chuang.

U.S. Pat. No. 7,233,392 issued to Margalith, et al. discloses a spectral imaging device including a optical parametric oscillator that can be tuned across a wide range of wavelengths while illuminating a target.

While HSAAI shares the ability to vary wavelength of operation, the waveguide method used in HSAAI is different from Margalith. Also, HSAAI discloses other benefits, like heterodyne detection.

Waveguide technology is also prior art. Of the several waveguide technologies available to implement the HSAAI, silicon is the most mature. The silicon waveguide technology was originally developed to implement fiber optic communications. Component parts developed and tested include light collectors that gather free-air light into a waveguide, waveguide designs that can turn sharp corners and be overlaid at right angles without cross-talk, polarization diversifiers to convert input light into one electromagnetic mode for waveguide transmission, interferometers that can also be used as optical switches, spectral resonators (generally in the form of one or more rings or racetracks), efficient light splitters and couplers, and waveguide-to-photo detector interfaces that currently provide a 60 Gigahertz (GHz) temporal bandwidth.

SUMMARY OF THE INVENTION

None of the prior art taken individually or collectively discloses and teaches a method comprising illuminating the scene by pulsing a laser diode, a light emitting diode, a laser, or another light source and communicating scene return light with a heterodyned starring gated-sensor to reduce the effect of background and dark current induced shot noise and eliminate speckle. None of the prior art taken individually or collectively discloses an apparatus with the active imaging technical advantages and benefits of the present invention.

The present invention uses a variety of waveguide components to implement heterodyne sensing in a starring array format. The known waveguide art is too diverse and has too many varieties to list, but the availability and conventional functionality of the waveguide components used in the current invention are known to those skilled in the art, albeit assembled into a novel and non-obvious system of the present invention.

Various methods for synchronizing an optical emitter with an optical receiver and using time-of-flight of the light to implement ranging are well known to experts in the field. The HSAAI invention uses a novel heterodyne photo detection implementation to mitigate the major noise sources that limit time-of-flight imaging performance. The HSAAI invention also uses a novel means for gating the optical receiver (that is, raising or lowering receiver sensitivity) during illuminator light emission.

HSAAI uses continuous wave laser diodes (CWLD) as illuminators. The "continuous" in CWLD refers to the type of diode and not the duty cycle of the light. CWLD are constructed differently than high peak power laser diodes (PPLD) that are designed to operate for only a short pulse period. CWLD can be pulsed continually without regard to duty cycle. PPLD are generally restricted to a duty cycle of approximately 0.02.

The limited pulse repetition rate of the peak illuminators leads to several performance problems. Speckle is a disturbing image artifact that is eliminated by summing ten or more pulses that return from each object in the scene. A video rate of 60 frames per second is generally desired in an imager, each frame requiring ten pulses to eliminate speckle. Further, most applications require either long range gates or the ability to visit many ranges each frame. Other than large and expensive laser sources, current PPLD technology does not provide both the peak power plus the high pulse repetition rate needed for many applications.

CWLD provides the high repetition rate needed for speckle reduction at video rates with many range gates. However, when direct detection is used, the signal-to-noise ratio is poor. CWLD provide too little energy per pulse to use direct detection, especially during the day against sunlit backgrounds.

Heterodyning solves the signal-to-noise problem. CWLD illuminators coupled with HSAAI receivers provide signals with a high signal-to-noise ratio and speckle free imagery over extended range gates.

For multi-pulse imaging, the duration of the laser pulse is set by $$t_{laser} = \frac{2(R_{max} - R_{DZ})}{c}$$

where c is the speed of light. $R_{max}$ is the longest effective range for a particular operating environment. It is set by the observer and depends on field conditions. $R_{DZ}$ is a dark zone that is needed to limit the dynamic range of the imager and to avoid light scattered by nearby airborne particulates. It is created by the delay $t_{DZ}$ between the end of the laser light pulse and the beginning of focal plane array (FPA) light integration. $t_{DZ}$ is also needed to clear the detectors of any signal generated during laser light emission.

Laser pulse duration $t_{laser}$ is the duration from the current laser pulse to the previously stored charge. Thus, the laser's duty cycle, $D_{cycle}$, is $$D_{cycle} = \frac{t_{laser}}{2t_{laser} + t_{DZ}}.$$

The only range $R_{ng}$ for which the focal plane array (FPA) integrates 100% of the laser light is $R_{max}$. Thus the duty cycle of the FPA, $D_{FPA}$, at closer ranges is $$D_{FPA} = \frac{R_{ng} - R_{DZ}}{R_{max} - R_{DZ}} \text{ for } RDZ \leq Rng \leq Rmax.$$

The effect of $D_{FPA}$ is that apparent illumination falls off proportional to range and not range-squared. Notice two things about the multi-pulse apparent irradiance. First, ground irradiance is fully utilized by the imager at the user-selected Rmax range. Second, effective illumination versus range is more uniform with multi-pulse than single-pulse; search and target acquisition are much easier with multi-pulse.

This disclosure describes the implementation of a two-dimensional array of heterodyned photo receptors, designated as light collection sites (LCS). The array size is M by N, where M and N are integers, and each integer can have a value between one and many thousands.

Implementation of an imaging camera providing M by N display pixels requires circuitry for synchronization, global or progressive shutter logic, row and column read-out, analog-to-digital conversion, non-uniformity corrections, and display formatting, to name some of the necessary functions. Certain of these required camera functions are well known to those skilled in the camera art, and a description of the implementation of many necessary camera functions is not provided in this disclosure.

The focus of the explanatory material in this disclosure is therefore describing the implementation of the LCS that enables heterodyne sensing in a starring array format.

The HSAAI of the present invention separates the light collection process from the photo detection process. Sometimes photo detection is referred to herein as simply detection. In the detection or photo detection process, light waves input to the photo detector are converted to electrical signals for further processing. That is, a two-dimensional array of light collection sites (LCS) is situated in the image plane of an objective lens. Each LCS contains an air-to-waveguide light coupler that conveys collected light into a waveguide within the LCS. In some embodiments, the light is conveyed to a polarization diversifier or a multi-mode-to-single mode converter and then into the waveguide.

Efficient heterodyning is implemented using waveguides to convey local oscillator light to each LCS, and at each LCS combining scene and local oscillator light streams in the LCS waveguide prior to heterodyning, which occurs during photo detection within each LCS. Combining the light streams in a waveguide prior to photo detection ensures good electric (E) field alignment and phase-front matching and therefore efficient heterodyning. In an alternative embodiment the photo detector is located remotely and can thereby services multiple LCSs.

Separating light collection from photo detection results in efficient heterodyning for two reasons. First, collecting light into a waveguide enables polarization diversification of the scene light; that is, most of the arriving scene light is converted to the polarization that will be used during heterodyning. Second, combining the local oscillator light and scene light in a waveguide prior to photo detection ensures efficient mixing of the light streams and alignment of phase fronts.

The HSAAI of the present invention also solves two problems associated with using small and power efficient continuous wave laser diode (CWLD) as gated illuminators for active imaging. Using low peak power laser diodes requires long dwell times to compensate for the low energy in each laser diode pulse. When heterodyne sensing is used, rather than direct detection, the output signal is proportional to the heterodyne shot noise, so the local oscillator amplitude is raised, making other system noises unimportant. Also, the wide spectral bandwidth associated with sunlight cannot produce a significant heterodyne signal. CWLD illuminators and heterodyne receivers therefore provide a low volume, low weight, highly power efficient active imager combination as described and claimed herein.

Because CWLDs emit little energy when pulsed quickly, active imagers using CWLDs must collect the light returns from many laser pulses before outputting an image frame. Each time the CWLD is pulsed, however, the photo detector must be shielded from the bright back scatter produced by nearby objects and the atmosphere when illuminated by the laser pulse.

Thus, the HSAAI of the present invention provides two means of interrupting the detector light stream without affecting the signal already integrated by the photo detector circuit. One technique uses an optical switch, such as a Mach Zehnder interferometer, in the LCS waveguide; the switch blocks received light during CWLD pulse emissions. A second technique, preferred over the first technique or used in combination with the first technique, is to slightly offset the wavelength of the local oscillator while the illuminator is emitting and for a short period thereafter, thereby creating a desired dark zone in the front of the imager so that bright reflections do not blind the camera. The local oscillator intensity is not varied when the wavelength is shifted, so the photodetector does not experience a direct current amplitude change. However, shifting the local oscillator frequency/wavelength results in shifting the heterodyne signal out of the photo detector temporal bandwidth.

The descriptions herein of each LCS are meant as "building blocks" with each block used, not used, or used many times as needed to optimize the final HSAAI design.

BRIEF DESCRIPTION OF THE DRAWINGS

A more complete understanding of these embodiments, and the attendant advantages and features thereof, will be more readily understood by reference to the following detailed description when considered in conjunction with the accompanying drawing. The drawings described herein are for illustrative purposes only of selected embodiments and not all possible apparatus configurations and are not intended to limit the scope of the present disclosure. The invention has the potential to be configured in multiple versions so as to generate superior technical performance in any given application. Therefore, it is understood that in some configurations not all elements will always be necessary for the specific embodiment or implementation of the invention. It should also be apparent that there is no restrictive one-to-one correspondence between any given embodiment of the invention and the elements in the drawing.

For clarity and in order to emphasize certain features, all of the invention features are not shown in the drawing, and all of the features that might be included in the drawing are not necessary for every specific embodiment of the invention. The invention also encompasses embodiments that combine features illustrated in the drawing; embodiments that omit, modify, or replace some of the features depicted; and embodiments that include features not illustrated in the drawing.

Figure 1:
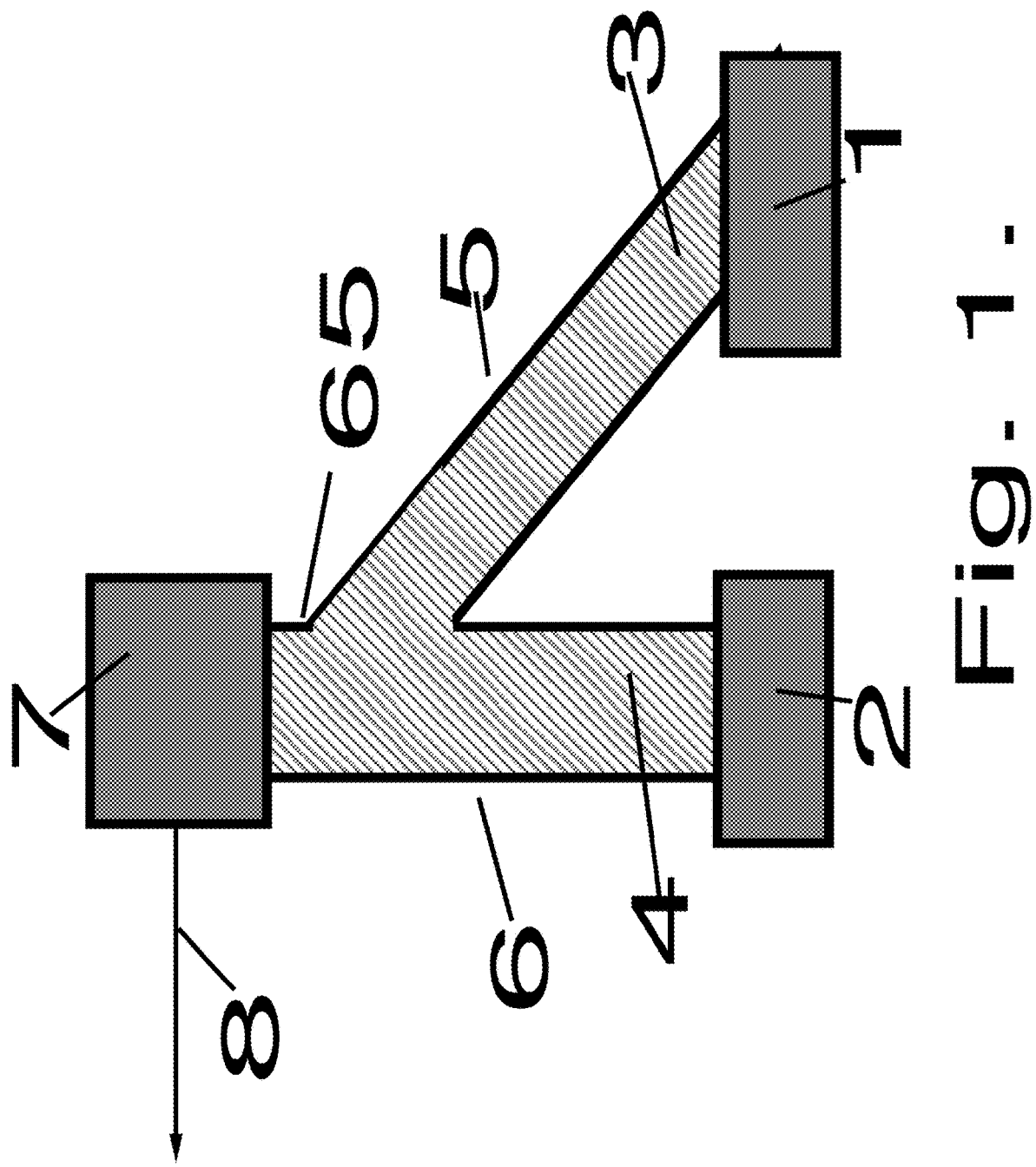

As used herein, relational terms, such as "first" and "second," "top" and "bottom," and the like, may be used solely to distinguish one entity or element from another entity or element without necessarily requiring or implying any physical or logical relationship or order between such entities or elements.

The drawing is integral to the application and is included by way of illustrating the HSAAI apparatus.

FIG. 1 illustrates the components associated with the heterodyne process at each light collection site (LCS).

Figure 2:
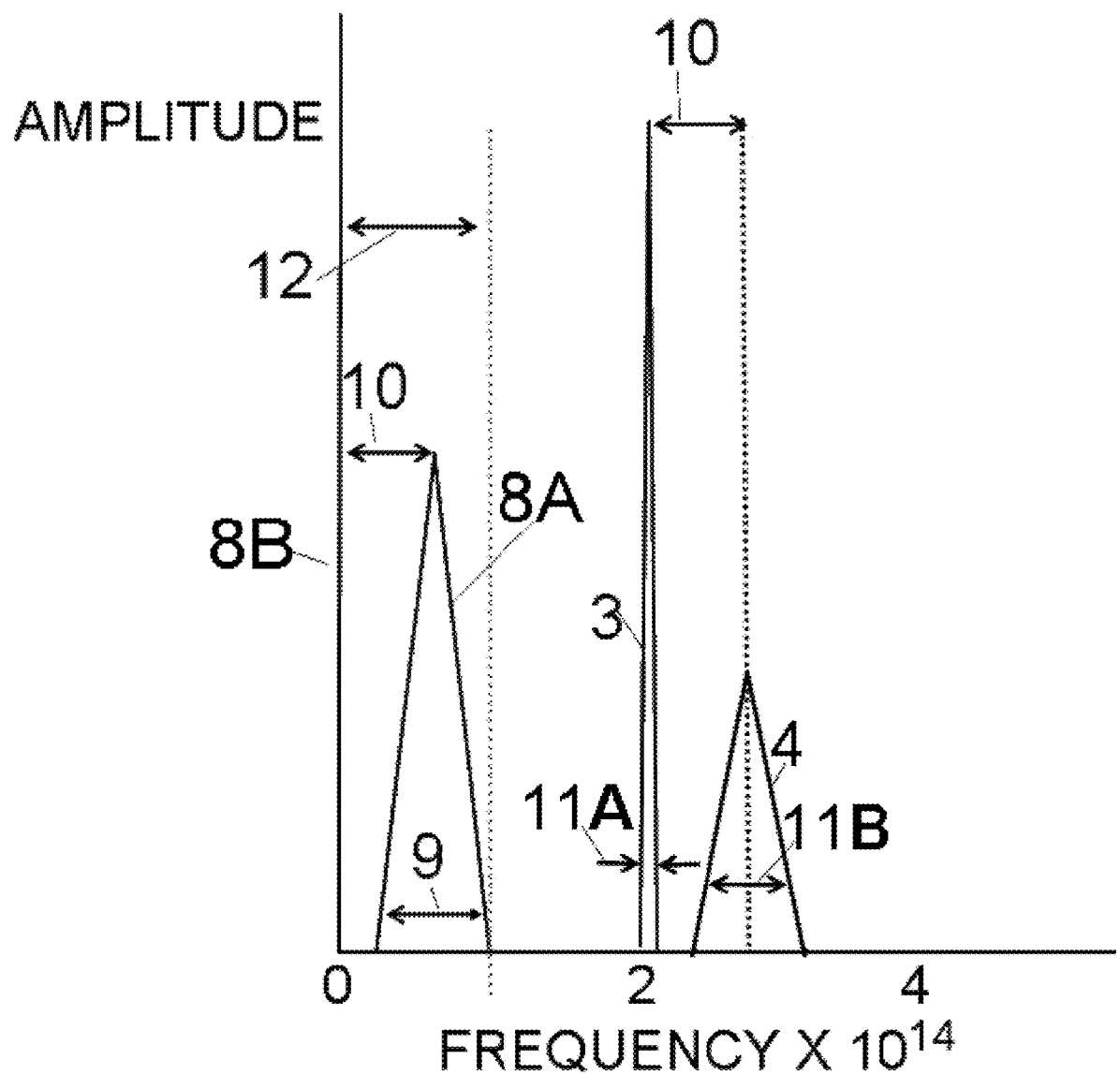

FIG. 2 illustrates wavelength relationships when heterodyning.

Figure 3:
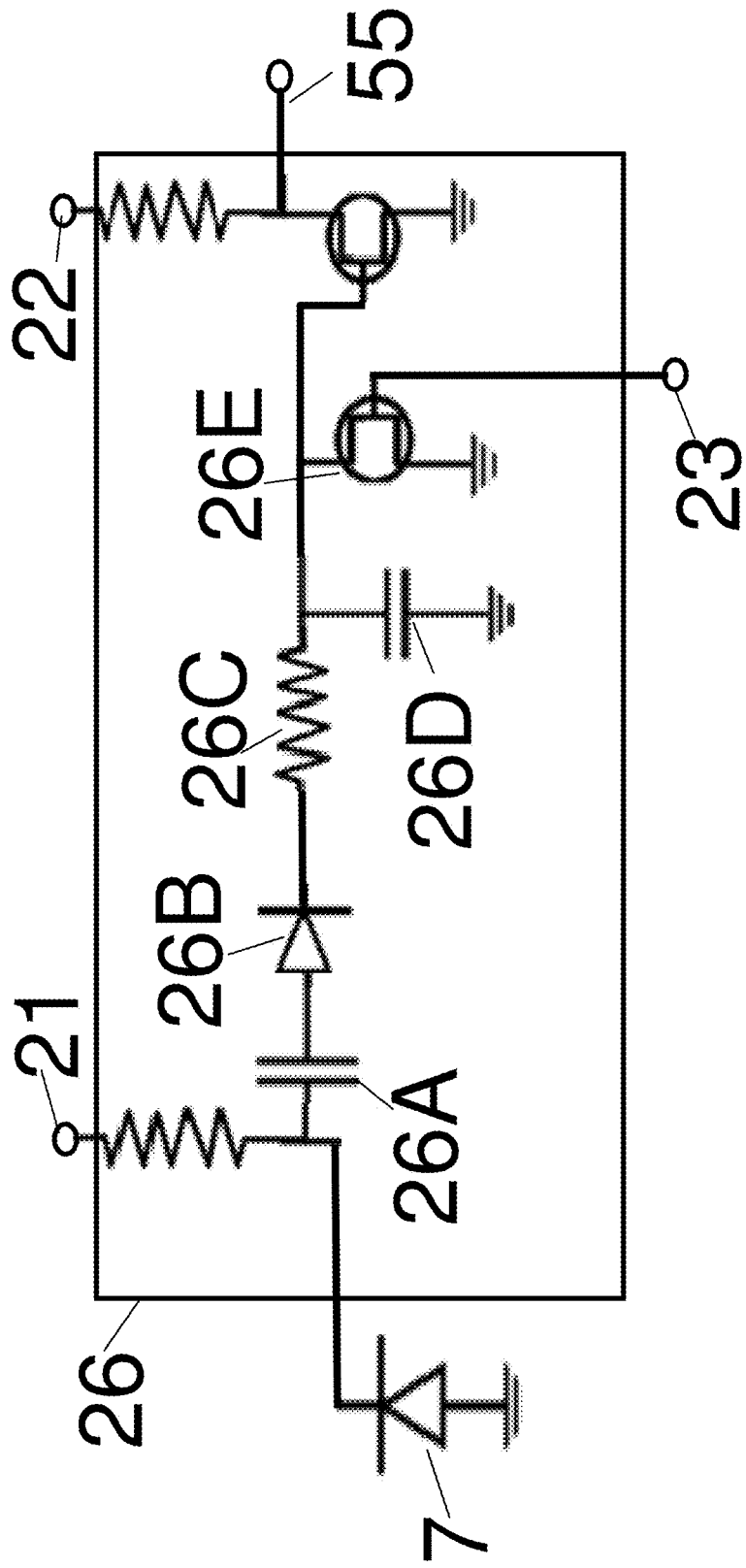

FIG. 3 depicts components of the photo detector output electronics according to one embodiment.

Figure 4:
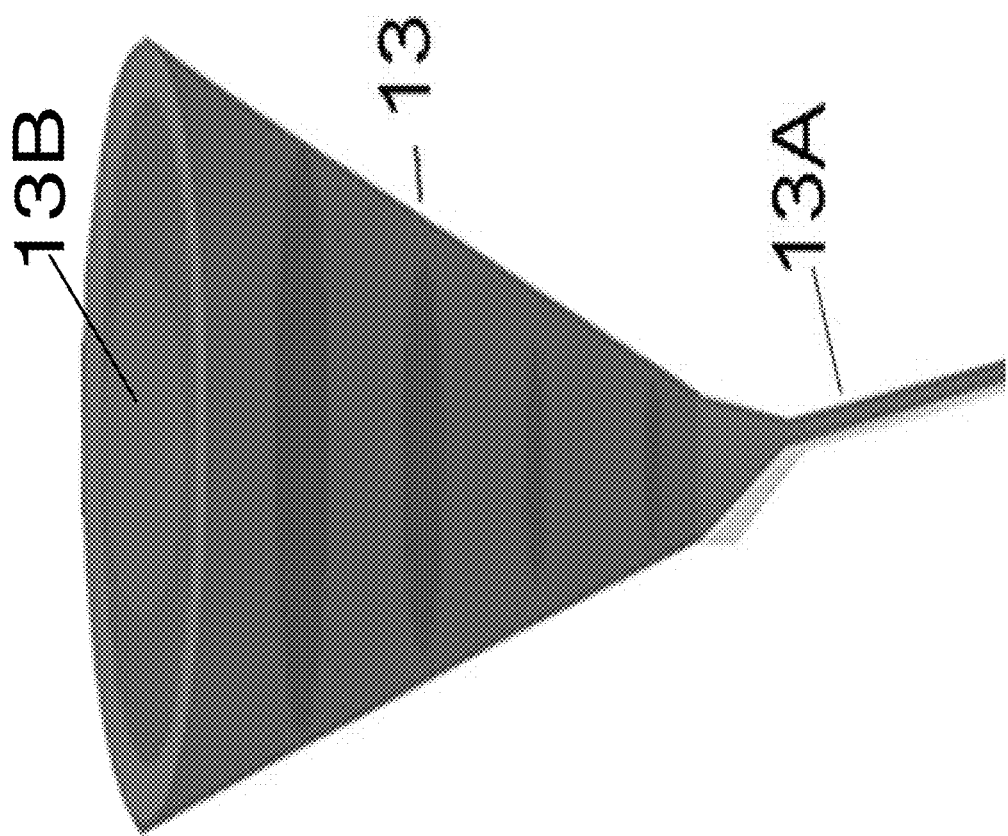

FIG. 4 illustrates a horn coupler used to couple free-air light from an objective lens into a waveguide.

Figure 5:
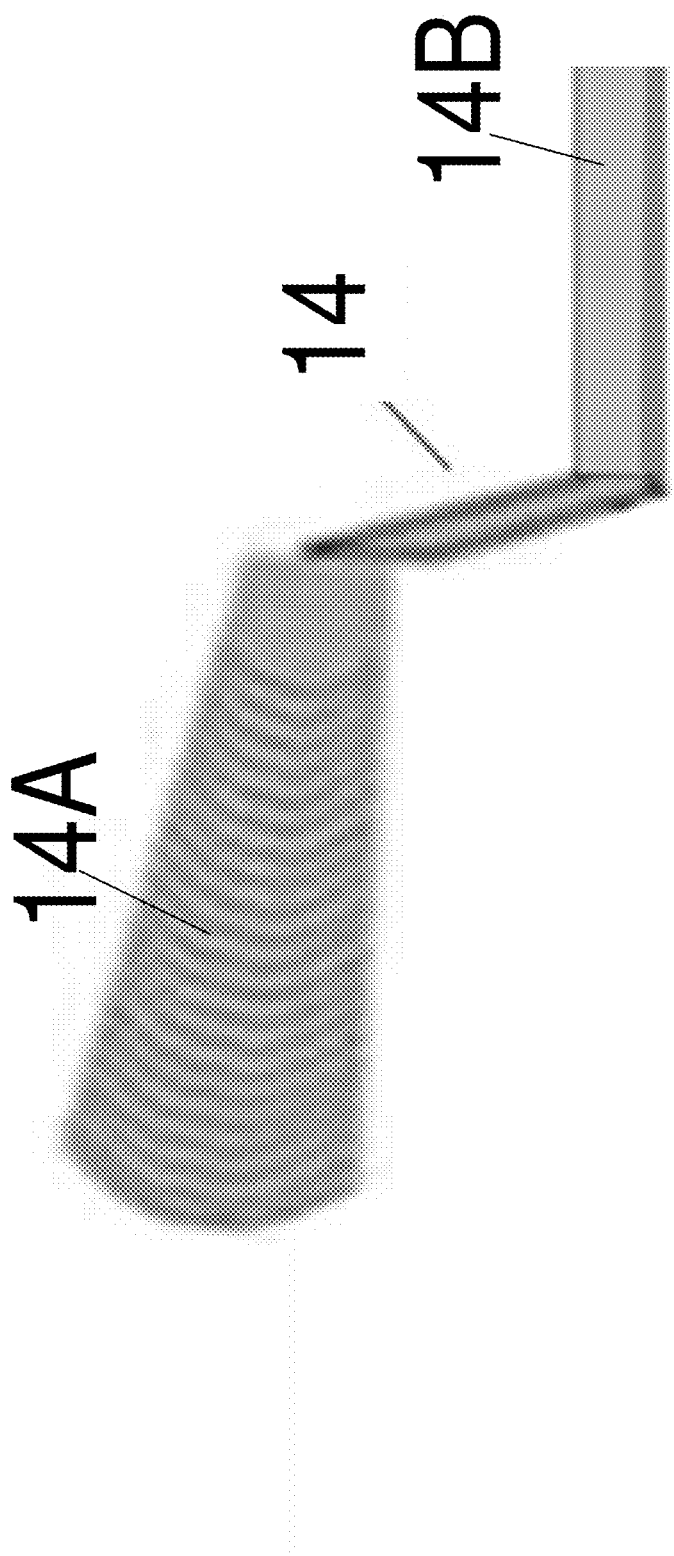

FIG. 5 illustrates a Bragg grating that can also be used to couple the light form an objective lens into a waveguide. Either a Bragg grating or a horn coupler, not both, would be used in each LCS.

Figure 6:
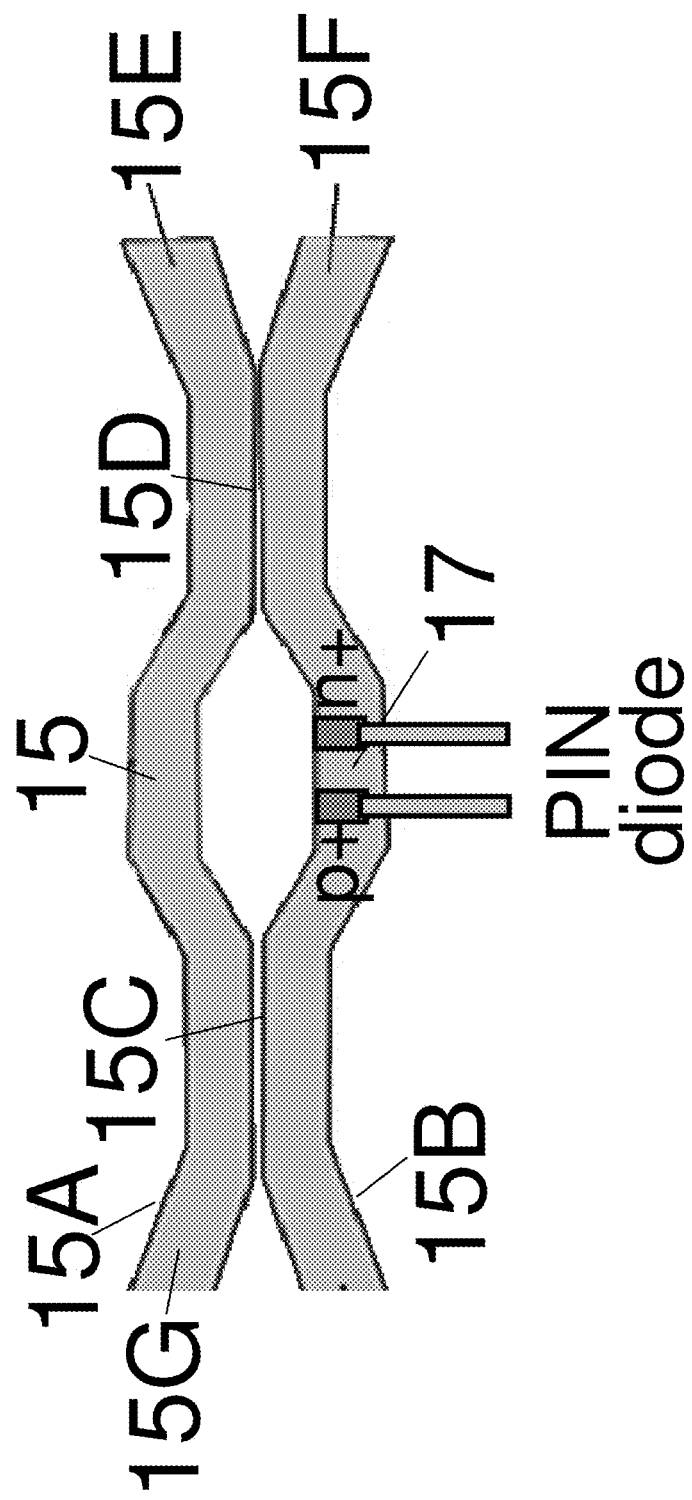

FIG. 6 illustrates a Mach Zehnder interferometer that can also be used as an optical switch. FIG. 6 shows the inclusion of a PIN diode to control the optical path length of one interferometer arm so that switching operation can be optimized for a selected wavelength.

Figure 7:
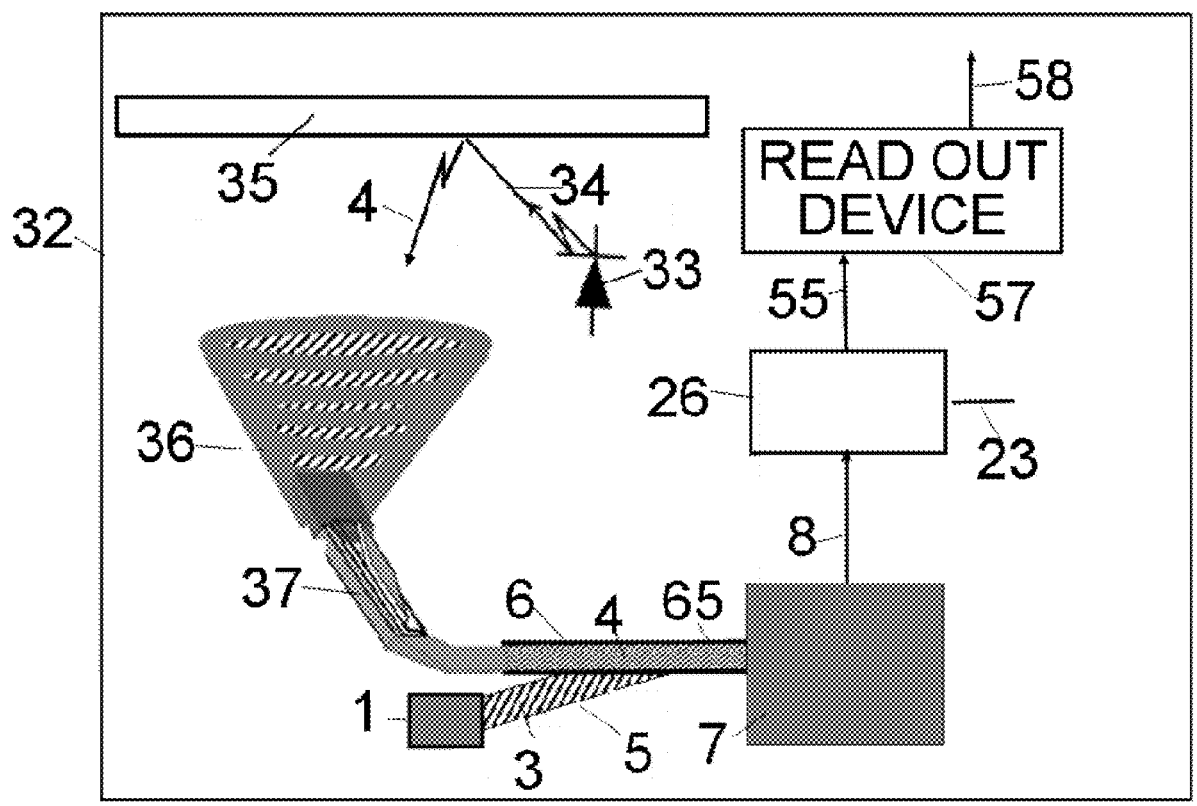

FIG. 7 illustrates operation of an active imager LCS.

Figure 8:
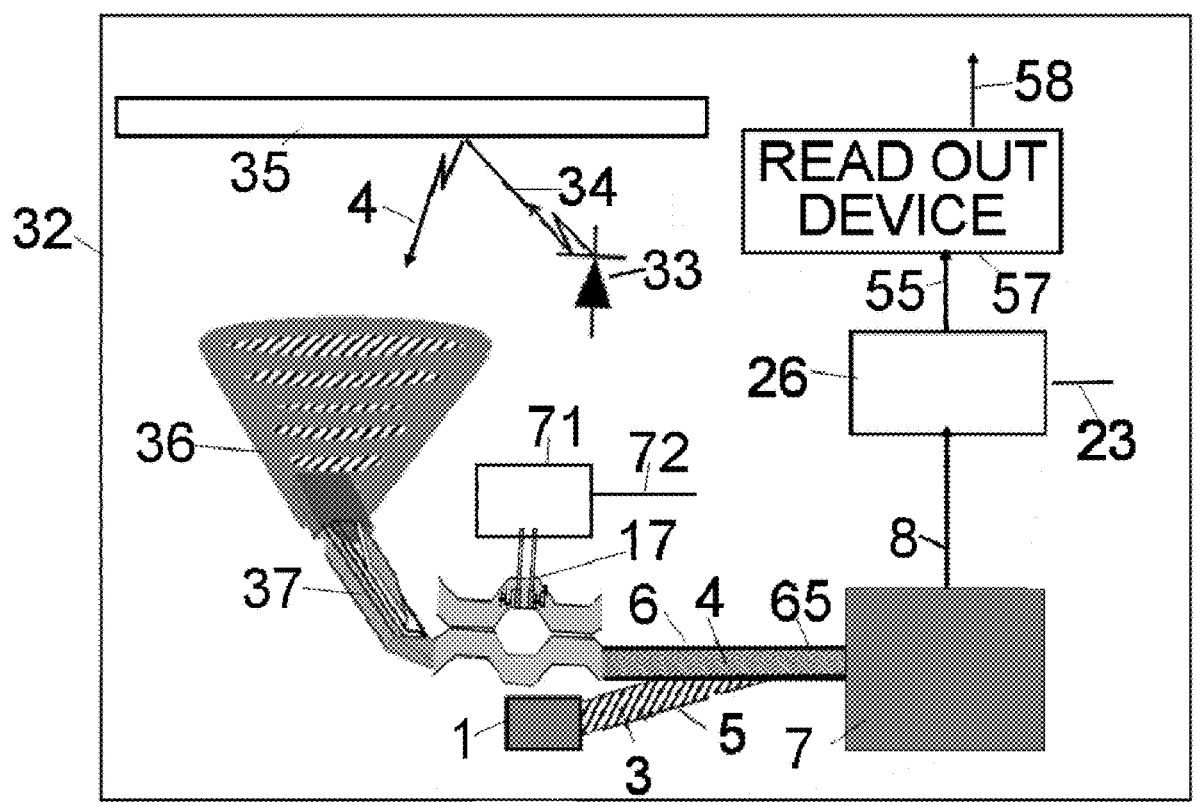

FIG. 8 illustrates the LCS with a Mach Zehnder interferometer added as an optical switch to help reduce backscatter signal during illuminator emission.

DETAILED DESCRIPTION OF THE PREFERRED EMBODIMENTS

Any reference to "invention" or the specific invention name "HSAAI" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities, dimensions, spatial characteristics, compositional characteristics and performance characteristics may be used explicitly or implicitly herein, but such specific quantities are presented as examples only and are approximate values unless otherwise indicated. Discussions and depictions pertaining to these, if present, are presented as examples only and do not limit the applicability of other characteristics, unless otherwise indicated.

In describing preferred and alternate embodiments of the invention, specific terminology is employed for the sake of clarity. The technology described herein, however, is not intended to be limited to the specific terminology so selected, and it is to be understood that each specific element includes all technical equivalents that operate in a similar manner to accomplish similar functions.

The drawings use a combination of electrical symbols, logic symbols and pictorial representations to illustrate the elements of the invention. In the interest of clarity, the symbols are simplified and do not explicitly show unneeded detail.

Example embodiments will now be described more fully with reference to the accompanying drawings of the invention. Specific details are set forth such as examples of specific components and methods to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known device structures are not described in detail.

The invention has the potential to be configured in multiple versions so as to generate superior technical performance in any given application. Therefore, it is understood that in some configurations not all elements will always be necessary for the specific embodiment or implementation of the invention. It should also be apparent that there is no restrictive one-to-one correspondence between any given embodiment of the invention and the elements in the drawing.

The HSAAI invention comprises a two-dimensional array of N by M light collecting sites (LCS). This invention applies to any N by M array of LCSs where N and M are integers and where either or both N and M can equal one or any large integer value.

The HSAAI heterodyning process is illustrated by the components in FIG. 1. Light sources 1 and 2 generate light signals 3 and 4 (with different wavelengths) propagating through waveguides 5 and 6, respectively. The waveguides are then joined into a single waveguide 65 bringing the waveguides 5 and 6 together, so that the two light signals or light streams 3 and 4 have the same electromagnetic mode and are polarization aligned for heterodyning within a photo detector 7. The photo detector 7 is a square law photo detector that heterodynes or multiplies the light signals 3 and 4 to generate the photo detector electrical output signal 8.

FIG. 2 illustrates a frequency spectrum of the light signal 4 (now referred to as the scene light or the scene light signal) for mixing or heterodyning with the light signal 3 (now referred to as the local oscillator signal or the local oscillator light signal), the result appearing as the photo detector output signal 8, comprising a direct current component 8B and a multi-frequency component 8A (also referred to as the heterodyned signal). The frequency spectrum of the heterodyned signal is identified by a reference character 9. The existence and properties of the frequency spectrum 9 are understood by those who are skilled in the heterodyning art. The frequency spectrum 9 is centered at a difference frequency 10, i.e., the difference between the center frequencies of the local oscillator signal 3 and the scene light signal 4. In other words, a replica of the optical frequency spectrum of the scene light signal 4 is approximately duplicated as the frequency spectrum of the heterodyned signal 9 centered at the difference frequency 10 in the photo detector electrical output signal 8. Note that the heterodyned signal 9 would be an exact amplified and frequency-shifted version of the frequency spectrum of the scene light 4 if the local oscillator signal 3 was monochromatic.

In the FIG. 2 illustration, the bandwidth 11B of scene light signal 4 is much larger than a bandwidth 11A of local oscillator light signal 3. That simplifying assumption is made in order to improve light collection efficiency, but does not represent a limitation on the invention. A temporal bandwidth 12 required for the photo detector 7 depends on both the difference frequency 10 between the frequencies of light streams 3 and 4 plus the temporal bandwidth of the heterodyned signal 9 (which is the bandwidth of the local oscillator signal 3 convolved with the bandwidth of the light signal 4). To the extent practical, the bandwidth of the local oscillator signal 3 is smaller than the spectral bandwidth of scene-return light signal 4 in order to maximize the amount of scene return light that fits within the temporal bandwidth 12 of the output signal 8 from the photo detector 7. Note that unlike prior art, which senses a phase relationship between the light streams 3 and 4, the current HSAAI does not use phase information.

FIG. 3 shows the photo diode 7 and one implementation of the photo diode output circuit 26. Reference numbers 21 and 22 indicate supply voltages. Circuit elements are shown to illustrate a desired function; those skilled in the electronics art are aware that alternative components are available to perform the same or similar functions. Alternating current (AC) coupling (by a capacitor 26A) is necessary to pass the heterodyned spectral bandwidth signal (8A in FIG. 2) and block the direct current signal (8B in FIG. 2). During a frame period, the heterodyned signal is rectified by a diode 26B (in one embodiment a metal-oxide-metal diode), and then integrated or low pass filtered by a resistor 26C and a capacitor 26D. Thus, the three functions associated with each LCS photo detector are: AC couple, rectify, and low pass filter or integrate. These functions can be implemented in a variety of ways using a variety of components. A reset signal, reference number 23, is applied to a FET 26E, and the reset operation activated to short the capacitor 26D after the frame signal (recall that the frame signal is derived from a number of illuminating light pulses) is read out from the output circuit 26.

A frame signal 55 in FIG. 3 output from the output circuit 26 is buffered and input to circuits (not shown) that provide row and column addressing, read logic, analog to digital conversion, and an interface to a digital processor or display means. Many different forms of circuits and components to perform these functions are known to those skilled in the art.

FIG. 4 illustrates a horn coupler 13 comprising a horn antenna. The coupler guides light from an objective lens (not shown but that gathers light from the scene) into an input port 13B and then into a waveguide via an output port 13A. The horn coupler can be fabricated in silicon, for example, using anisotropic etching, or can be fabricated out of different materials using appropriate fabrication techniques. The shape of the horn is derived from Maxwell's Equations. If the optimal horn length is excessive for the application, a plate or layer of lenslets to help collect scene light and increase the fill-factor can be used between the objective lens and the horn coupler. The output port or bottom region 13A of the horn coupler is shaped to efficiently conduct light into a waveguide connected to the output port; the waveguide not illustrated in FIG. 4 but further described below.

FIG. 5 illustrates a Bragg grating coupler 14, an alternative to the horn coupler 13 of FIG. 4. The grating coupler 14 comprises ridges 14A etched into a material surface. The collecting area (the ridged portion) of the grating is angled slightly to be oriented non-parallel to the LCS array surface in order to efficiently couple light from the scene/objective lens into the waveguide. Light from the objective lens of the system enters 14A of the Bragg grating coupler 14 and exits at an output 14B and then into a waveguide, which is not illustrated in FIG. 5 but further described below.

FIG. 6 illustrates a Mach Zehnder interferometer 15; like the horn coupler and Bragg grating coupler, the Mach Zehnder interferometer is well known to those skilled in the waveguide art. In the present invention, Mach Zehnder interferometers can be used as optical switches. Generally, a Mach Zehnder interferometer comprises two waveguides 15A and 15B that are brought into close proximity at two regions 15C and 15D along their length, as can be seen in FIG. 6. FIG. 6 depicts light introduced at an input 15G into a waveguide 15A. Evanescent coupling occurs at coupling regions 15C and 15D. The coupling region 15C splits the light such that a portion of the incident light into the waveguide 15A is coupled to a waveguide 15B. At the second coupling region 15D, the phase difference of the optical signal in the two waveguides 15A and 15B determines whether the light remains split or combines into either the waveguides 15A or 15B. In other words, the light can be directed to either output 15E (of the waveguide 15A) or the output 15F (of the waveguide 15B) by controlling the relative phase (i.e., phase difference) of the optical signal traveling in the two Mach Zehnder interferometer waveguides 15A and 15B.

In FIG. 6, a PIN diode 17 is shown as disposed in the waveguide 15B. The optical path length of light in the waveguide 15B can be varied by introducing electrical current into the PIN diode 17; that is, the refractive index of the waveguide is changed by forward biasing the PIN diode. Changing the refractive index changes the optical path length in the waveguide 15B relative to the path length in the waveguide 15A, thereby controlling the phase difference between the two propagating signals and therefore controlling whether the light outputs solely from the waveguide 15A or the waveguide 15B or is split between the two outputs. In effect, the PIN diode 17 functions to configure the Mach Zehnder interferometer as an electrically controllable optical switch.

FIG. 7 illustrates overall operation of an active imager LCS 32. A light source 33, a laser diode for example, generates a light signal 34 that reflects from a scene 35 into an LCS coupler 36. (Either the horn coupler 13 of FIG. 4 or the Bragg grating 14 of FIG. 5 may be used to collect light.) The return light (also referred to as the scene light 4) is converted to a single mode by a polarization diversifier 37 and the single mode scene light 4 travels into the waveguide 6. As in FIG. 1, the local oscillator source is indicated by the reference number 1, and the local oscillator light is designated by reference number 35 traveling through the waveguide 5.

Although FIG. 7 depicts the local oscillator source 1 as proximate the LCS 32, in a preferred embodiment the local oscillator light may be carried to each LCS in the LCS array by waveguides not shown in FIG. 7.

The polarization diversifier 37 can be fabricated to transmit transverse magnetic (TM) mode radiation and convert transverse electric input (TE) mode to TM. Conversely, the diversifier 37 can also be fabricated to transmit TE by converting input TM waves to TE mode waves.

Still referring to FIG. 7, the scene light 4 and local oscillator light 3 are combined in the waveguide 65. In waveguide 65, both light streams are the same mode and highly confined. The signal propagating through the waveguide 65 is input to the photo detector 7 (also referred to herein as a photo diode) in ways known to those skilled in the waveguide art. Heterodyning occurs in photo detector 7 with the heterodyned electrical output signal identified by the reference character 8 (also referred to as the photo detector output signal).

The photo detector output signal 8 in FIG. 7 is AC coupled, rectified, and integrated by the photo diode output circuit 26 (as described in conjunction with FIG. 3), producing the frame signal 55.

The light source 33 in FIG. 7 is pulsed rapidly in order to range gate out reflections from nearby air aerosols and local objects that will saturate the image and effectively hide more distant objects. Practical range gated imaging requires that the receiver be effectively turned off during illuminator emission and shortly thereafter in order to avoid excessively bright backscatter. Changing the wavelength of the local oscillator to de-sensitize the receiver provides a total solution in some cases. In other cases, when the laser return signal is large, one of the known means commonly used with laser radars can implemented in addition to or in lieu of changing the local oscillator wavelength.

Since each illuminator pulse contains little energy, many pulses, as reflected from the distant scene, must be integrated in capacitor 26D of FIG. 3 before the capacitor signal is strong enough to exceed any readout noise. That means that many laser pulses from the illuminator (also referred to as a light source) are emitted and reflected from the scene, while the reflected signals from previous illuminator pulses are stored on the capacitor 26D of FIG. 3. Since there is a strong return signal from nearby objects or from air aerosols during pulse emissions from the illuminator, it is necessary to prevent any signal from reaching the capacitor 26D when the illuminator is turned on.

That is accomplished, in one embodiment, by changing the local oscillator wavelength/frequency such that the difference frequency 10 in FIG. 2 is larger than the temporal bandwidth of the photo detector. In other words, the heterodyned signal 9 in FIG. 2 is at a high frequency beyond the bandwidth of the photo detector and therefore cannot contribute to the output electrical signal 8A from the photo detector 7.

Note that the amplitude of the local oscillator is not changed when the frequency/wavelength is changed, so that no AC coupled signal on the integrating capacitor 26D in FIG. 2 results from shifting of the local oscillator wavelength.

Thus, during periods when the illuminator is emitting, the wavelength of the local signal 3 (see FIG. 2) is moved (shifted to a shorter wavelength) in order to inhibit heterodyning by shifting the heterodyne signal to a very high frequency outside of the photo diode bandwidth. When the illuminator stops emitting, the local oscillator wavelength is returned to a wavelength close to or within the spectral bandwidth 11 of the scene light 4, such that heterodyned detection of reflected scene light once again occurs.

The frame at each LCS is created by integrating many illuminator pulses. As described above, the local oscillator frequency is shifted during each illuminator pulse in order to prevent heterodyning and integration of the illuminator signal. Once the illuminator is turned off, the local oscillator is returned to a wavelength that places the bandwidth 9 of heterodyned electrical signal 8A within the temporal bandwidth of the photo detector. See FIGS. 1 and 2. The weak reflections returning from the scene are heterodyned efficiently and the resultant signal is stored in the capacitor 26D (FIG. 3), pending arrival of a subsequent pulse or pulses.

After enough pulses have been summed to achieve a suitably high signal-to-noise ratio, the frame signal 55 at each LCS site is read out by a read-out device 57 employing row and column read logic. As shown in FIG. 7, the read-out device 57 receives the frame signal 55 from each LCS in an array (only one shown in FIG. 7) and combines the frame signals to produce an array signal 58, which depicts the entire imaged scene. When the array signal is generated, the capacitor 26D of FIG. 3 is reset by applying the reset signal 23 to close the FET 26E, shorting the capacitor 26D to ground, thereby getting the capacitor ready to begin integrating the photo detector output signals for the next frame signal from each LCS site.

Nominal illumination duty cycle is 0.5. If the maximum range to be sensed is $R_{max}$, then the illuminator is turned on for time $t_{laser}$ equal to $2 R_{max}/c$ where c is the speed of light. That is, the pulse is just long enough to reach from the HSAAI to the maximum range and back. The illuminator is then turned off for a time $t_{laser}$ to achieve the 0.5 duty cycle.

If a dark zone in front of the HSAAI is desired, then the local oscillator wavelength is not restored to its desired wavelength for efficient heterodyning for some period longer than $t_{laser}$. That is, the local oscillator wavelength is always shifted to stop signal integration on capacitor 26D in FIG. 3 at the start of $t_{laser}$. However, integration is not necessarily restored at the end of $t_{laser}$ but can be delayed in order to not integrate light reflected from nearby objects. Since many pulses are integrated during each image frame, effective illumination versus range is controlled by varying the start of integration time pulse-by-pulse. That is, the dark zone in front of the HSAAI is varied pulse by pulse to generate the desired apparent illumination at each range.

Range from a scene object to each LCS imaging that object is found by illuminating one whole frame (FRAME_1) using a fixed time for $t_{laser}$. For the next frame, FRAME_2, the duty cycle of the laser illuminator is linearly decreased from a 0.5 duty cycle to zero from start of frame to end of frame, respectively, while not changing the pulse stop times. That is, the series of laser pulses emitted during the second frame have their pulse on-times shortened by delaying the start time of each subsequent pulse. The range to the object reflecting light into each LCS is then $R_{max}$ minus (LCS amplitude FRAME_2 divided by LCS amplitude FRAME_1) multiplied by $R_{max}$. Frame one has constant pulses of the normal type described earlier in the application. Frame two uses pulses that are equal in length at the very start of the frame but the pulse width gets shorter as the frame goes on until the width is zero at frame stop. Accuracy of range to a surface is improved by averaging over several or many LCS location.

FIG. 8 is similar to FIG. 7 with the addition of a Mach Zehnder optical switch 15 to provide additional blockage of the scene light signal 4 during illuminator emission. The description of elements 1,2,3, 4, 5, 6, 7, 8, 23, 24,26, 33, 34, 35, 36, 37, 55, and 58 are all the same as in FIG. 7.

In FIG. 8, the Mach Zehnder optical switch 15 is added between the polarization diversifier 37 and the waveguide 6. A current mirror circuit 71 is set by control lines and voltage strobes 72 to provide current to the pin diode 17 for accurate on and off states for the wavelength of the illuminator or light source 33. The Mach Zehnder optical switch switches the light in waveguide 6 off when the illuminator 33 is on.

What is claimed is:

1. A heterodyne starring array active imager for producing an image, the heterodyne starring array imager comprising:
    a light source for intermittently illuminating a scene;
    an array of light collecting sites imaging the scene, each one of the light collecting sites comprising:
        a coupling component for optically coupling scene light into a first waveguide;
        a local oscillator light coupled into a second waveguide;
        the first and second waveguides coupled to a third waveguide, the scene light and the local oscillator light merging and propagating into the third waveguide;
        a square law photo detector for receiving light propagating in the third waveguide, wherein heterodyning of the scene light and the local oscillator light occurs at the photo detector to produce a photo detector output signal;
        components for processing and integrating a plurality of the photo detector output signals to produce a frame signal; and
    a read-out device producing an array signal responsive to the frame signal from each light collecting site.

2. The heterodyne starring array imager of claim 1 wherein while the light source illuminates the scene, a wavelength of the local oscillator light is changed such that a difference frequency of the local oscillator light and the scene light is outside a temporal bandwidth of the square law photo detector.

3. The heterodyne starring array imager of claim 1 wherein the coupling component comprises a horn coupler or a Bragg grating coupler.

4. The heterodyne starring array imager of claim 3 wherein the horn coupler or the Bragg grating coupler is fabricated in silicon.

5. The heterodyne starring array imager of claim 1 further comprising a polarization diversifier for converting the scene light to a single mode, the polarization diversifier disposed between the coupling component and the first waveguide.

6. The heterodyne starring array imager of claim 1 wherein the light source comprises a continuous laser source with a gate to provide gated control of illumination to intermittently illuminate the scene, and wherein the gated control is adjustable to provide different range gate settings.

7. The heterodyne starring array imager of claim 1 wherein the components for processing and integrating comprise components for AC coupling, rectifying, and low pass filtering or integrating the photo detector output signal to produce the frame signal.

8. The heterodyne starring array imager of claim 1 wherein the array of light collecting sites comprises an N×M array of light collecting sites where N and M are integer values.

9. The heterodyne starring array imager of claim 1 wherein the light source comprises a pulsed light source.

10. The heterodyne starring array imager of claim 1 wherein the scene light and the local oscillator light are of the same mode.

11. The heterodyne starring array imager of claim 1 wherein intermittently illuminating the light source comprises pulsing the light source on and off, and wherein integrating by the components does not begin until a period of time after an on pulse illuminating the light source has ended.

12. The heterodyne starring array imager of claim 1 wherein intermittently illuminating the light source comprises pulsing the light source on and off, and wherein for a first frame a duty cycle of the on and off pulses is 0.5, and wherein during subsequent frames the duty cycle is reduced to 0.

13. The heterodyne starring array imager of claim 1 further comprising a component for preventing the scene light from entering the first waveguide when the light source is illuminating the scene.

14. The heterodyne starring array image of claim 13 wherein the component comprises a Mach Zehnder interferometer disposed between the coupling component and the first waveguide, the Mach Zehnder interferometer operating as an optical switch.

15. The heterodyne starring array imager of claim 1 wherein a wavelength of the local oscillator light is shifted when the light source is illuminating the scene such that the photo detector output signal is outside a bandwidth of the square law photo detector when the light source is illuminating the scene.

16. The heterodyne starring array imager of claim 1 wherein each photodetector output signal is generated responsive to light reflected from the scene as collected by one of the light collecting sites from the array of light collecting sites.

17. The heterodyne starring array imager of claim 1 wherein the intermittently illuminated light is illuminates the scene for a time $t_{laser}$ with a duty cycle of 0.5, and wherein a wavelength of the local oscillator light is selected such that heterodyning of the scene light and the local oscillator light generates a photo detector output signal within a bandwidth of the square law photodetector during $t_{laser}$, and wherein for a period at least equal to $t_{laser}$ a wavelength of the local oscillator light is shifted such the heterodyning of the scene light and the local oscillator light generates a photo detector output signal outside a bandwidth of the square law photodetector.

18. The heterodyne starring array imager of claim 17 wherein the period is at least equal to $t_{laser}$ or is greater than $t_{laser}$.

19. The heterodyne starring array imager of claim 1 wherein a spectral bandwidth of the local oscillator light is smaller than a spectral bandwidth of the scene light.

20. A heterodyne starring array active imager for producing an image, the heterodyne starring array imager comprising:
    a continuous laser light source for intermittently illuminating a scene by operation of an adjustable range gate, wherein intermittently illuminating the light source comprises pulsing the light source on and off, and wherein for a first frame a duty cycle of the on and off pulses is 0.5, and wherein during subsequent frames the duty cycle is reduced to 0;

an N×M array of light collecting sites imaging the scene, wherein N and M are integers and each one of the light collecting sites comprising:

a coupling component further comprising a horn coupler or a Bragg grating coupler for optically coupling scene light into a first waveguide;

a Mach Zehnder interferometer disposed between the coupling component and a first waveguide, the Mach Zehnder interferometer operating as an optical switch;

a polarization diversifier for converting the scene light to a single mode, the polarization diversifier disposed between the Mach Zehnder and the first waveguide;

a local oscillator light coupled into a second waveguide, wherein a spectral bandwidth of the local oscillator light is smaller than a spectral bandwidth of the scene light;

the first and second waveguides coupled to a third waveguide, the scene light and the local oscillator light merging and propagating into the third waveguide;

a square law photo detector for receiving light propagating in the third waveguide, wherein heterodyning of the scene light and the local oscillator light occurs at the photo detector to produce a photo detector output signal;

wherein while the light source illuminates the scene, a wavelength of the local oscillator light is changed such that a difference frequency of the local oscillator light and the scene light is outside temporal bandwidth of the square law photo detector;

components for AC coupling rectifying, and low pass filtering or integrating a plurality of the photo detector output signals to produce a frame signal; and a read-out device producing an array signal responsive to the frame signal from each light collecting site.

\* \* \* \* \*